United States Patent
Tsujimoto et al.

(10) Patent No.: US 9,618,055 B2
(45) Date of Patent: Apr. 11, 2017

(54) CONSTANT-VELOCITY JOINT

(71) Applicant: HONDA MOTOR CO., LTD., Tokyo (JP)

(72) Inventors: Fumihiko Tsujimoto, Utsunomiya (JP); Itsuro Wakao, Shiraoka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/612,488

(22) Filed: Feb. 3, 2015

(65) Prior Publication Data

US 2015/0219165 A1 Aug. 6, 2015

(30) Foreign Application Priority Data

Feb. 6, 2014 (JP) .................................. 2014-021224

(51) Int. Cl.
  *F16D 3/205* (2006.01)
  *F16D 3/202* (2006.01)

(52) U.S. Cl.
  CPC .... *F16D 3/2055* (2013.01); *F16D 2003/2026* (2013.01); *F16D 2300/22* (2013.01); *Y10S 464/905* (2013.01)

(58) Field of Classification Search
  CPC ........ F16D 3/202; F16D 3/205; F16D 3/2052; F16D 3/2055; F16D 3/2057; F16D 2003/2026; F16D 2300/22
  USPC .......................... 464/111, 120–123, 132, 905
  See application file for complete search history.

(56) References Cited

U.S. PATENT DOCUMENTS

| | | | |
|---|---|---|---|
| 2007/0149296 A1* | 6/2007 | Yoon ..................... | F16D 3/2055 464/111 |
| 2010/0310307 A1 | 12/2010 | Weckerling et al. | |
| 2011/0053695 A1* | 3/2011 | Yun ....................... | F16D 3/2055 464/11 |

(Continued)

FOREIGN PATENT DOCUMENTS

| | | | | |
|---|---|---|---|---|
| DE | 102007059377 A1 * | 6/2009 | ........... | F16D 3/2055 |
| EP | 1286069 A1 * | 2/2003 | ........... | F16D 3/2055 |

(Continued)

OTHER PUBLICATIONS

Translation of EP 1286069. Woerner, et al. Tripod Joint. Feb. 26, 2003.*

*Primary Examiner* — Josh Skroupa
(74) *Attorney, Agent, or Firm* — Squire Patton Boggs (US) LLP

(57) ABSTRACT

A constant-velocity joint includes an inner member. The inner member has holders that hold respective roller assemblies. Each of the holders has contact regions, which are held in abutment against an inner circumferential wall surface of an inner roller of a corresponding one of the roller assemblies, and non-contact regions, which are spaced from the inner circumferential wall surface of the inner roller. The contact regions are formed by first through fourth lobes, and the non-contact regions are formed by first through fourth recesses, for example. Hypothetical tangential lines L1 and L3, which are tangential to the first lobe and the third lobe, extend parallel to the longitudinal directions of respective guide grooves. Hypothetical tangential lines L2 and L4, which are tangential to the second lobe and the fourth lobe, extend perpendicularly to the longitudinal directions of the guide grooves.

5 Claims, 10 Drawing Sheets

(56) References Cited

U.S. PATENT DOCUMENTS

2014/0287841 A1* 9/2014 Miao ................ F16D 3/202
 464/111

FOREIGN PATENT DOCUMENTS

| JP | 2011-501068 A | 1/2011 | | |
|---|---|---|---|---|
| WO | WO 2008044292 A1 * | 4/2008 | ........... | F16D 3/2055 |
| WO | WO 2013080751 A1 * | 6/2013 | ............. | F16D 3/202 |

* cited by examiner

CONSTANT-VELOCITY JOINT

CROSS-REFERENCE TO RELATED APPLICATION

This application is based upon and claims the benefit of priority from Japanese Patent Application No. 2014-021224 filed on Feb. 6, 2014, the contents of which are incorporated herein by reference.

BACKGROUND OF THE INVENTION

Field of the Invention

The present invention relates to a constant-velocity joint, which is interposed between a first transmission shaft and a second transmission shaft, for transmitting rotary drive power from the first transmission shaft to the second transmission shaft.

Description of the Related Art

Automobiles are arranged such that rotary drive power, which is generated by an internal combustion engine, an electric motor, or the like, is transmitted to the tires by drive power transmission shafts such as drive shafts, etc. In this case, the automobile is driven when the tires are rotated by the transmitted rotary drive power.

A constant-velocity joint is interposed between the drive power transmission shafts. The constant-velocity joint interconnects the drive power transmission shafts, such that the drive power transmission shafts can rotate about respective axes thereof.

One known type of constant-velocity joint is a tripod constant-velocity joint. Such a tripod constant-velocity joint comprises an outer member having a bottomed cup, and an inner member that is fitted to the distal end of a drive power transmission shaft. Rollers, which are held by holders of the inner member, slide while rotating within respective guide grooves defined in an inner wall surface of the bottomed cup. When the drive power transmission shaft is tilted at a prescribed working angle, the rollers are tilted within the guide grooves in response to the inner member being tilted within the outer member.

Generally, the tripod constant-velocity joint operates by rotating, sliding, and tilting, as described above. When the rollers are tilted, the rollers are restrained by the guide grooves. In the case that the rollers slide while being restrained, slippage occurs between the wall surfaces of the guide grooves and the rollers, thus resulting in an increase in sliding resistance. Sliding resistance also increases when the rollers rotate.

Such increased sliding resistance is responsible for vibration and noise. Japanese Laid-Open Patent Publication No. 2011-501068 (PCT) discloses a constant-velocity joint having roller assemblies, each of which includes an inner roller, and an outer roller, which is mounted on the inner roller through an interposed needle bearing. The inner roller is restrained against rotation by a holder of an inner member.

SUMMARY OF THE INVENTION

According to the technique disclosed in Japanese Laid-Open Patent Publication No. 2011-501068 (PCT), the holder is held in contact with an inner circumferential wall surface of the inner roller at one point of contact. Therefore, rotary drive power is transmitted through the contact region. Since stresses are concentrated at the contact region, the contact region tends to suffer from fatigue at an early stage. Stated otherwise, according to the disclosed technique, durability of the constant-velocity joint cannot easily be assured.

A major object of the present invention is to provide a constant-velocity joint, which is capable of reducing sliding resistance.

Another object of the present invention is to provide a constant-velocity joint in which durability of the constant-velocity joint can be maintained.

According to an embodiment of the present invention, a constant-velocity joint is provided, which is interposed between a first transmission shaft and a second transmission shaft, for transmitting rotary drive power from the first transmission shaft to the second transmission shaft. The constant-velocity joint comprises an outer member coupled to the first transmission shaft, the outer member having a plurality of guide grooves defined in a side wall surface thereof, the guide grooves being spaced at prescribed intervals from each other and extending in an axial direction of the outer member, an inner member coupled to the second transmission shaft and inserted into the outer member, the inner member having an annular member and a plurality of holders, which project respectively from the annular member into the guide grooves, and a plurality of roller assemblies rotatably mounted on the holders, respectively, each of the roller assemblies including an inner roller and an outer roller, which is disposed outwardly of and mounted on the inner roller through interposed rolling members. Each of the holders has a plurality of contact regions held in abutment against an inner circumferential wall surface of the inner roller, and a plurality of non-contact regions spaced from the inner circumferential wall surface of the inner roller, the contact regions and the non-contact regions being arranged alternately. Further, the contact regions at least include parallel regions where hypothetical tangential lines thereto extend parallel to longitudinal directions of the guide grooves, and perpendicular regions where hypothetical tangential lines thereto extend perpendicularly with respect to the longitudinal directions of the guide grooves.

According to the present invention, on each of the holders of the inner member of the constant-velocity joint, the parallel regions where the hypothetical tangential lines extend parallel to the longitudinal directions of the guide grooves in the outer member, and the perpendicular regions where the hypothetical tangential lines extend perpendicularly to the longitudinal directions of the guide grooves are provided as the contact regions, which are held in contact with the inner circumferential wall surface of the inner roller. With such an arrangement, a resultant vector is produced by a force that acts from the diametrical center of the holder toward one of the parallel regions, and by a force that acts from the diametrical center of the holder toward one of the perpendicular regions. The resultant vector generates a gripping force on the inner roller. Since slippage is prevented from occurring between the inner roller and the holders, slipping resistance is reduced, thereby reducing a commensurate amount of sliding resistance. Therefore, thrust resistance also is reduced.

Since there are two contact regions including a parallel region and a perpendicular region, stresses are distributed. Thus, the holders are prevented from becoming fatigued and worn at an early stage.

For the reasons described above, the constant-velocity joint produces reduced sliding or thrust resistance, and durability of the constant-velocity joint is maintained.

Each of the holders preferably is of a crisscross shape as viewed in plan. During operation of the constant-velocity joint, points of contact between the inner circumferential wall surface of the inner roller and the side wall of the holder, i.e., a trunnion, change from one pair of parallel and perpendicular regions to another pair of parallel and perpendicular regions. Therefore, the holders are prevented from suffering from undue fatigue and becoming worn, in comparison with an arrangement in which only a pair of parallel and perpendicular regions are held in abutment against the inner circumferential wall surface of the inner roller. Thus, high durability of the constant-velocity joint is assured.

The parallel regions preferably include side wall surfaces, which are of a straight shape when viewed in a cross-sectional plane taken along a line that passes through the parallel regions and a diametrical center of each of the holders. In this case, the parallel regions and the inner circumferential wall surface of the inner roller are held in point-to-point contact. Therefore, at the time that the second transmission shaft is tilted at a working angle, the constant-velocity joint operates smoothly.

The inner roller preferably has an inside diameter, which is minimum at a portion thereof that is closer to the annular member than a substantially heightwise intermediate portion thereof. Consequently, the inner roller has a low center of gravity, which minimizes circumferential oscillations of the inner roller. As a result, frictional resistance is reduced, which also contributes to a reduction in thrust resistance.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A constant-velocity joint according to a preferred embodiment of the present invention will be described in detail below with reference to the accompanying drawings.

Figure 1:
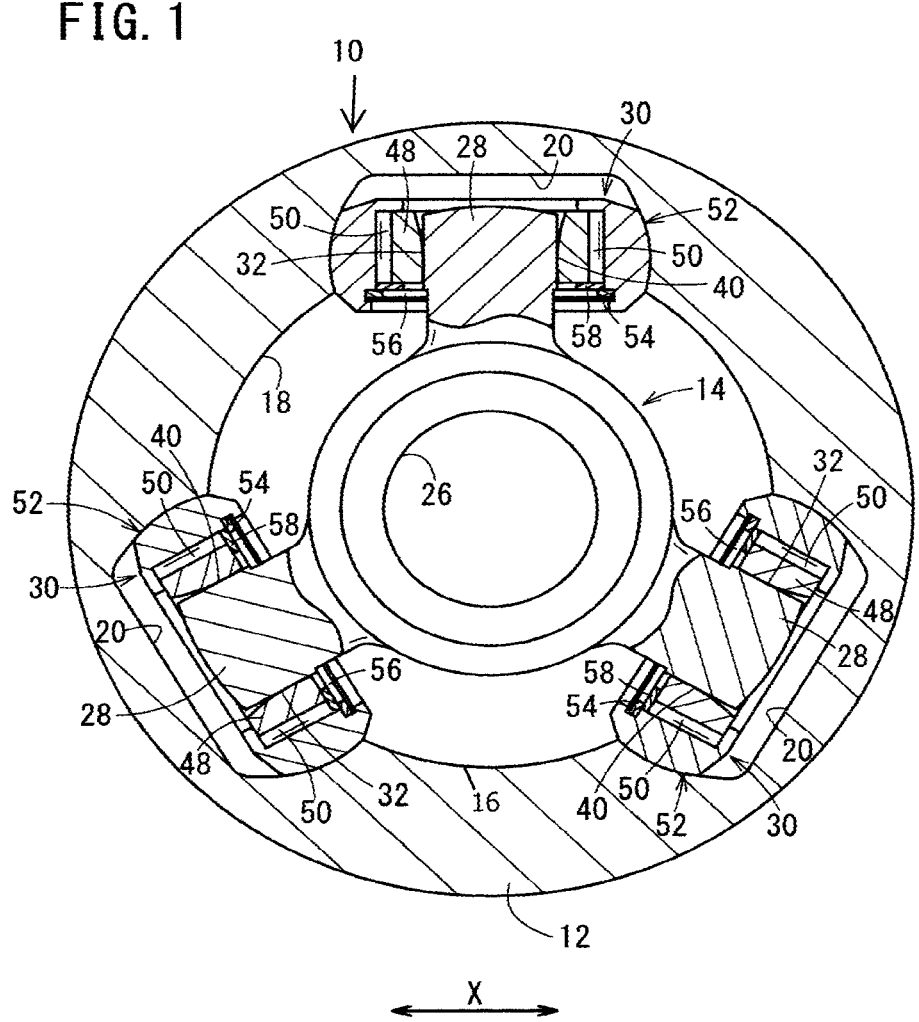
FIG. 1 is a transverse cross-sectional view of a constant-velocity joint according to an embodiment of the present invention, the view being taken along a line perpendicular to an axial direction of the constant-velocity joint.
Figure 2:
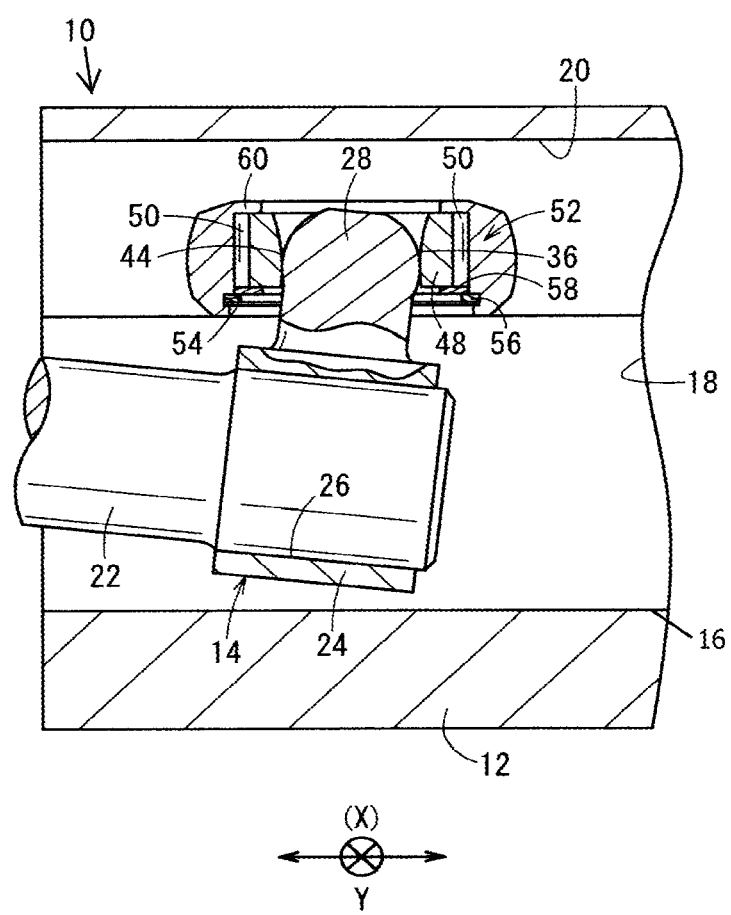
FIG. 2 is a fragmentary sectional side elevational view of the constant-velocity joint along the axial direction thereof.

FIG. 1 shows in transverse cross section a constant-velocity joint 10 according to an embodiment of the present invention, the view being taken along a line perpendicular to an axial direction of the constant-velocity joint. FIG. 2 shows in fragmentary sectional side elevation the constant-velocity joint along the axial direction thereof. In FIG. 1, the arrow X represents a widthwise or transverse direction of an outer member 12. In FIG. 2, the arrow Y represents a longitudinal direction of the constant-velocity joint 10. The X direction and the Y direction are perpendicular to each other.

The constant-velocity joint 10 comprises an outer member 12 and an inner member 14. The outer member 12 has a bottomed cup 16, and a non-illustrated shaft that protrudes from the outer surface of a bottom of the bottomed cup 16. A first transmission shaft, not shown, such as the rotational shaft of a transmission, for example, is coupled to the shaft of the outer member 12. The bottomed cup 16 has a bottomed hole 18 defined therein, which extends along the Y direction shown in FIG. 2, i.e., along the longitudinal direction of the constant-velocity joint 10. The bottomed hole 18 includes three guide grooves 20 (see FIG. 1) defined in an inner circumferential side wall surface thereof. The guide grooves 20 are spaced mutually at prescribed intervals and extend in the axial direction of the outer member 12.

As shown in FIG. 2, the inner member 14 is fitted over the distal end of a second transmission shaft 22, e.g., a drive shaft, and is inserted into the bottomed hole 18. More specifically, the inner member 14 comprises an annular member 24 with a hole 26 defined therein, and with the second transmission shaft 22 being press-fitted in the hole 26. The hole 26 is defined by an inner wall surface of the annular member 24, which has non-illustrated teeth formed thereon. The second transmission shaft 22 has a side wall surface, which also has non-illustrated teeth formed thereon. The teeth on the inner wall surface of the annular member 24 and the teeth on the side wall surface of the second transmission shaft 22 are held in meshing engagement with each other.

The inner member 14 includes the annular member 24 and three trunnions 28 (see FIG. 1), which are joined to the annular member 24 and serve as holders that project respectively into the three guide grooves 20. Roller assemblies 30 are rotatably mounted on the trunnions 28, respectively.

Figure 3:
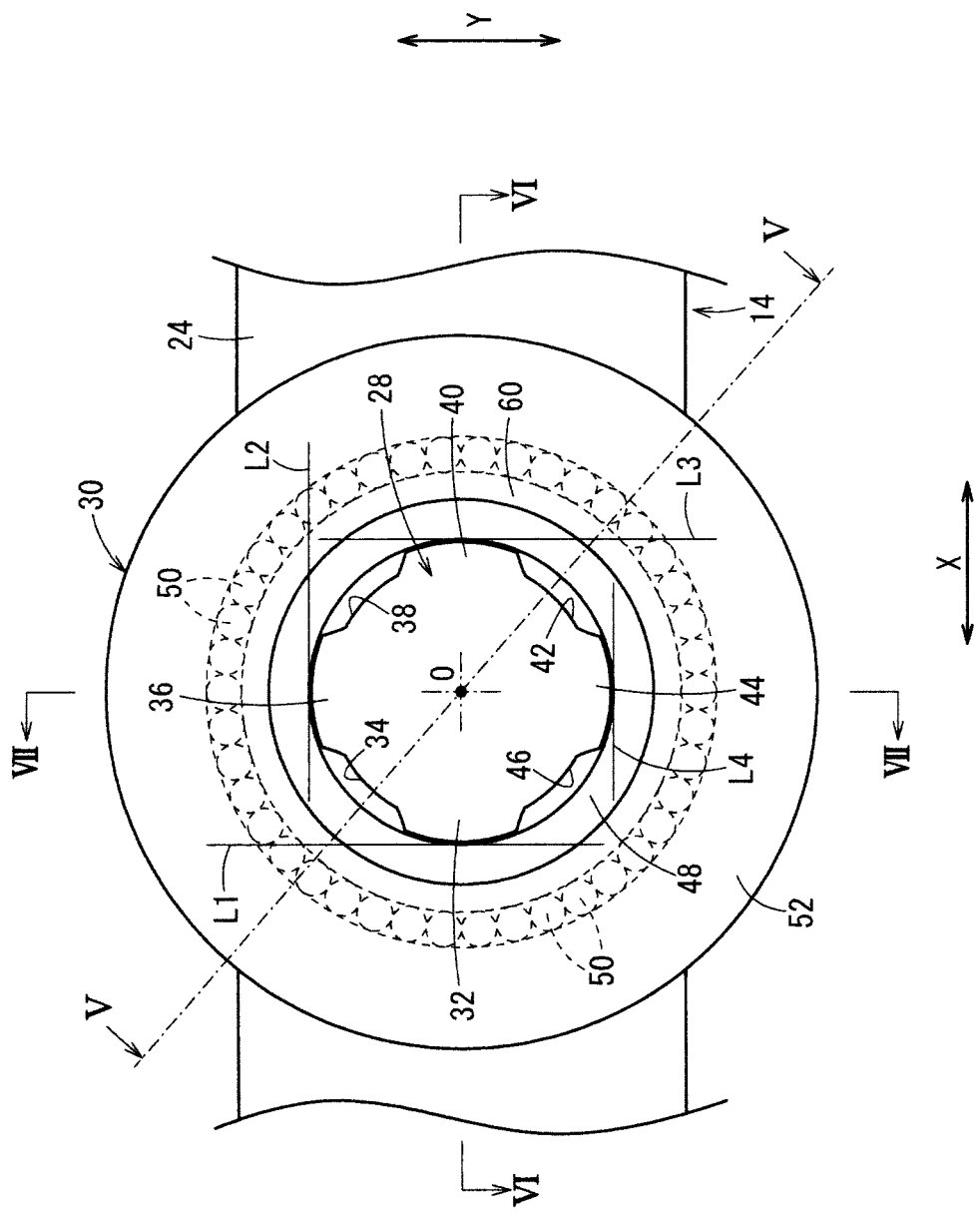
FIG. 3 is a plan view of a trunnion with a roller assembly mounted thereon.
Figure 4:
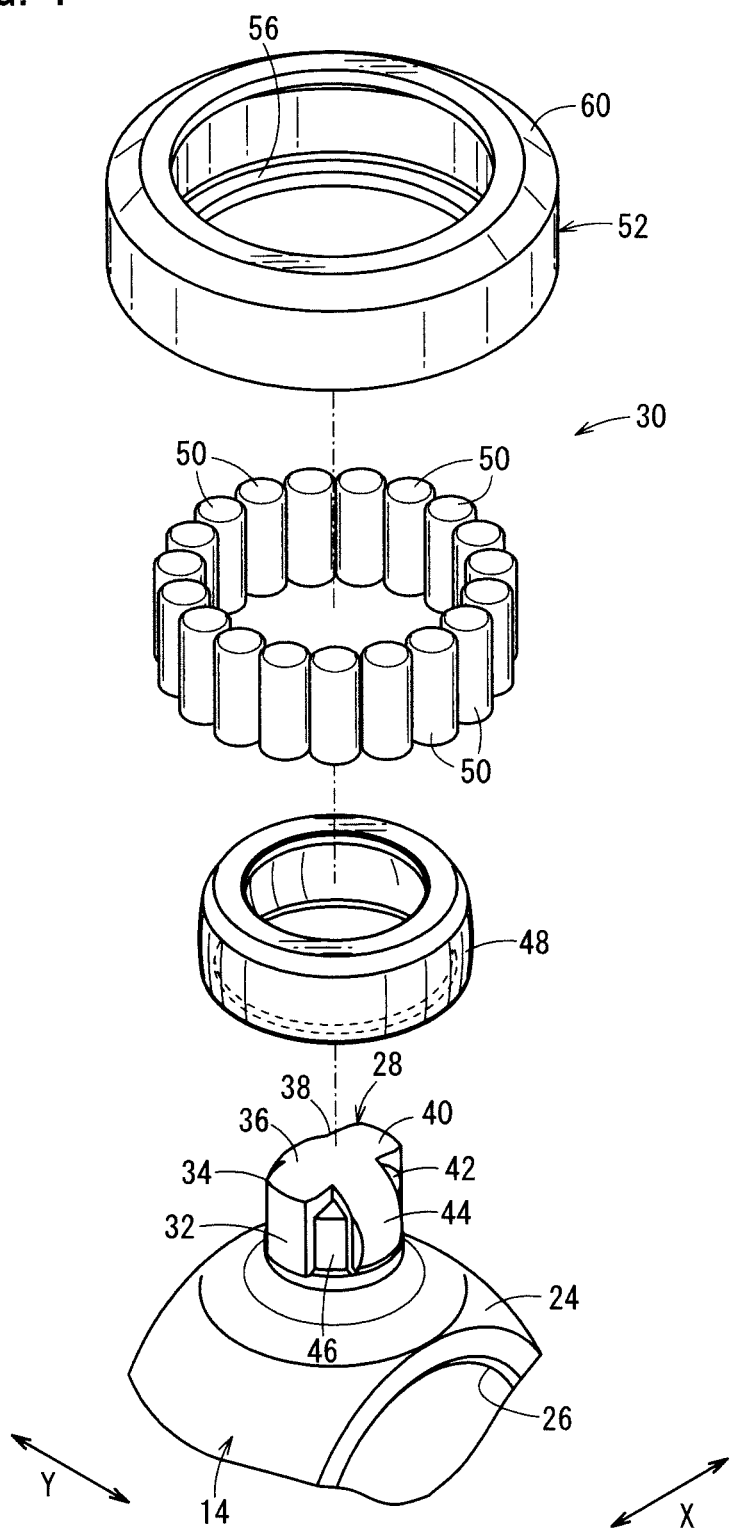
FIG. 4 is an exploded perspective view of the roller assembly and the trunnion in a disassembled state.

FIG. 3 shows in plan one of the trunnions 28 on which the roller assemblies 30 are rotatably mounted. FIG. 4 shows in exploded perspective the trunnion 28 and the roller assembly 30 in a disassembled state. The X and Y directions shown in FIGS. 3 and 4 correspond respectively with the X and Y directions shown in FIG. 1.

The shape of the trunnion 28 will be described in detail below. The trunnion 28 includes a first lobe 32, a first recess 34, a second lobe 36, a second recess 38, a third lobe 40, a third recess 42, a fourth lobe 44, and a fourth recess 46, which are arranged in succession. More specifically, the lobes and the recesses are arranged alternately. The trunnion 28 has an outer side wall surface with an undulating shape in a radial direction thereof, such that the trunnion 28 is of a substantially crisscross shape as viewed in plan (see FIG. 3).

Only the curved side surfaces of the first lobe 32, the second lobe 36, the third lobe 40, and the fourth lobe 44 of the trunnion 28 are held in abutment against the inner circumferential wall surface of an inner roller 48 of the roller assembly 30. On the other hand, the surfaces of the trunnion 28 that define the first recess 34, the second recess 38, the third recess 42, and the fourth recess 46 are spaced from the inner circumferential wall surface of the inner roller 48. The first lobe 32, the second lobe 36, the third lobe 40, and the fourth lobe 44 serve as contact regions, which abut against the inner circumferential wall surface of the inner roller 48, whereas the first recess 34, the second recess 38, the third recess 42, and the fourth recess 46 serve as non-contact regions, which are spaced from, i.e., held out of abutment with, the inner circumferential wall surface of the inner roller 48.

As shown in FIG. 3, hypothetical tangential lines L1, L2, L3, L4 are drawn tangentially to the first lobe 32, the second lobe 36, the third lobe 40, and the fourth lobe 44. The hypothetical tangential line L1 to the first lobe and the hypothetical tangential line L3 to the third lobe 40 extend parallel to the Y direction, whereas the hypothetical tangential line L2 to the second lobe 36 and the hypothetical tangential line L4 to the fourth lobe 44 extend parallel to the X direction. Since the X direction is perpendicular to the Y direction, the hypothetical tangential lines L2, L4 are perpendicular to the Y direction.

The first lobe 32 and the third lobe 40 serve as parallel regions where the hypothetical tangential lines L1, L3 extend parallel to the longitudinal direction of the guide groove 20. The second lobe 36 and the fourth lobe 44 serve as perpendicular regions where the hypothetical tangential lines L2, L4 extend perpendicularly to the longitudinal direction of the guide groove 20. With respect to the trunnion 28, the first lobe 32 and the third lobe 40, which serve as parallel regions, and the second lobe 36 and the fourth lobe 44, which serve as perpendicular regions, are held in abutment against the inner circumferential surface of the inner roller 48.

Figure 5:
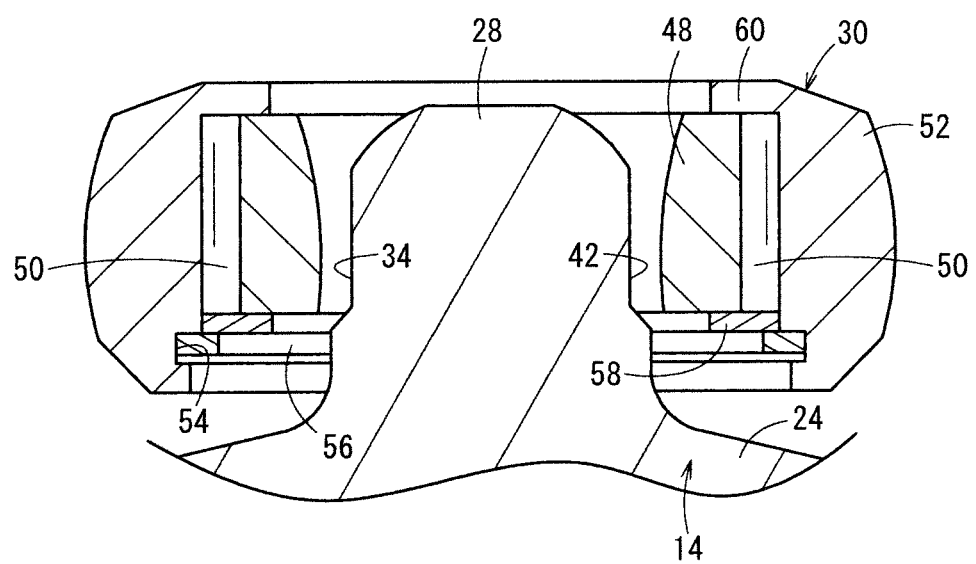
FIG. 5 is a cross-sectional view taken along line V-V of FIG. 3.
Figure 6:
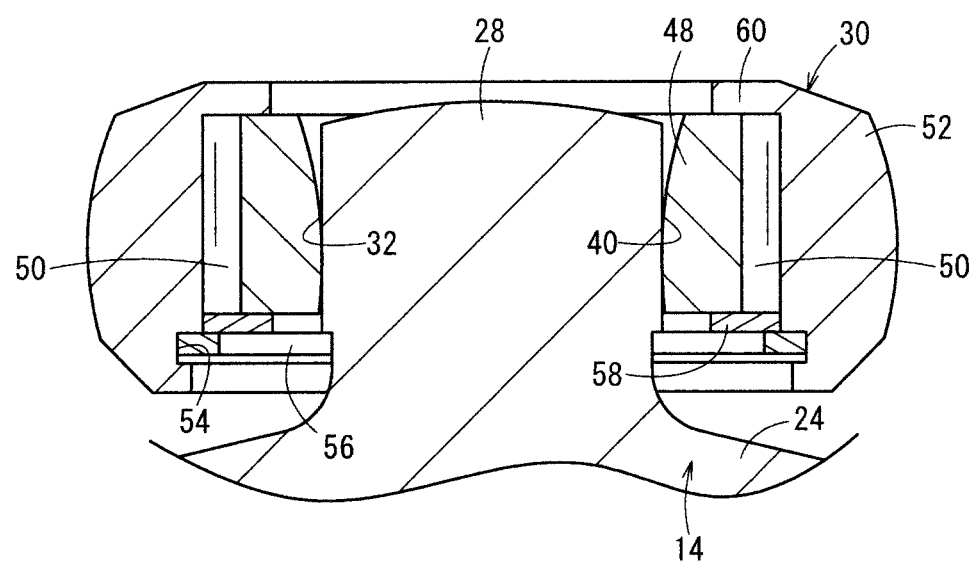
FIG. 6 is a cross-sectional view taken along line VI-VI of FIG. 3.
Figure 7:
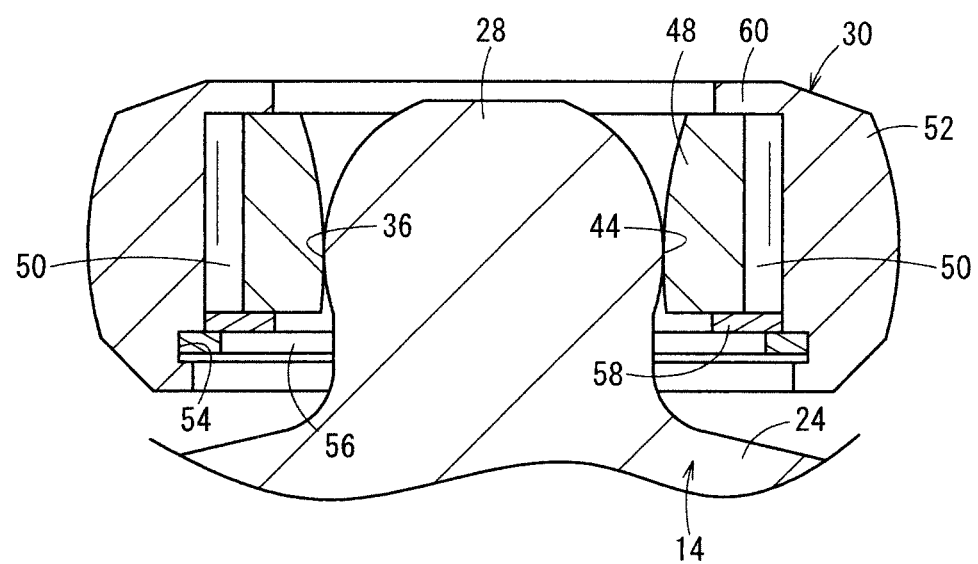
FIG. 7 is a cross-sectional view taken along line VII-VII of FIG. 3.

FIGS. 5, 6, and 7 are cross-sectional views taken along line V-V, line VI-VI, and line VII-VII, respectively, of FIG. 3. As shown in FIG. 3, all of the lines V-V, VI-VI, and VII-VII pass through a central point O on the upper end face of the trunnion 28. Further, as can be seen from FIG. 5, the first recess 34 and the third recess 42, which serve as non-contact regions, are spaced from the inner circumferential surface of the inner roller 48.

As shown in FIG. 6, each of the first lobe 32 and the third lobe 40 has a substantially constant radius from a proximal end near the annular member 24 to the distal end thereof. Therefore, as shown in FIG. 6, which is a cross-sectional view taken along the line VI-VI that passes through the central point O and the third lobe 40, the side wall surface of the trunnion 28 has a straight shape.

As shown in FIG. 7, each of the second lobe 36 and the fourth lobe 44 has a maximum diameter between a proximal end near the annular member 24 and a substantially heightwise intermediate portion thereof. From the maximum-diameter portion to the proximal end, the radius of curvature of the second lobe 36 and the fourth lobe 44 gradually decreases, such that the second lobe 36 and the fourth lobe 44 are arcuately shaped with a larger radius of curvature. From the maximum-diameter portion to the distal end, the radius of curvature of the second lobe 36 and the fourth lobe 44 gradually decreases, such that the second lobe 36 and the fourth lobe 44 are arcuately shaped with a smaller radius of curvature.

The roller assembly 30 has the inner roller 48 and an outer roller 52 in the form of a hollow cylinder, which is fitted over the inner roller 48, with a needle bearing 50, which comprises a plurality of small cylindrical rollers, being interposed therebetween. As shown in FIGS. 4 through 7, the inner circumferential wall surface of the inner roller 48 bulges diametrically inward at a lower portion, which is slightly closer to the annular member 24 (at the proximal end of the trunnion 28) than a substantially heightwise intermediate portion thereof. In other words, the inside diameter of the inner roller 48 is minimum at the portion that is slightly lower than the substantially heightwise intermediate portion. The minimum inside diameter portion of the inner circumferential wall surface of the inner roller 48 is held in abutment against the first lobe 32, the second lobe 36, the third lobe 40, and the fourth lobe 44.

The inside diameter of the inner roller 48 is slightly greater than the outside diameter of the trunnion 28. Therefore, in practice, the inner circumferential wall surface of the inner roller 48 and the side wall surface of the trunnion 28 are held in contact with each other, either at two locations represented by the first lobe 32 and the second lobe 36, or at two locations represented by the third lobe 40 and the fourth lobe 44.

The outer roller 52 has an annular groove 54, which is defined in an inner circumferential wall surface thereof. A circlip 56 is fitted in the annular groove 54, so as to position a retaining ring 58 securely in the outer roller 52. The small cylindrical rollers of the needle bearing 50 are rollingly held in the outer roller 52 by the retaining ring 58 and a flange 60 of the outer roller 52.

The constant-velocity joint 10 according to the present embodiment is constructed basically as described above. Operations and advantages of the constant-velocity joint 10 will be described below.

When the first transmission shaft rotates about its axis, the rotary drive power thereof is transmitted through the trunnions 28, which engage in the respective guide grooves 20 in the outer member 12, to the inner member 14. The rotary drive power is further transmitted to the second transmission shaft 22 that is fitted in the inner member 14, so that the first transmission shaft and the second transmission shaft 22 rotate in the same direction.

If the second transmission shaft 22 is tilted at a prescribed working angle, then the second transmission shaft 22 assumes the posture shown in FIG. 2. At this time, each of the roller assemblies 30 slides along a corresponding one of the guide grooves 20 while being restrained by the guide grooves 20.

Figure 8:
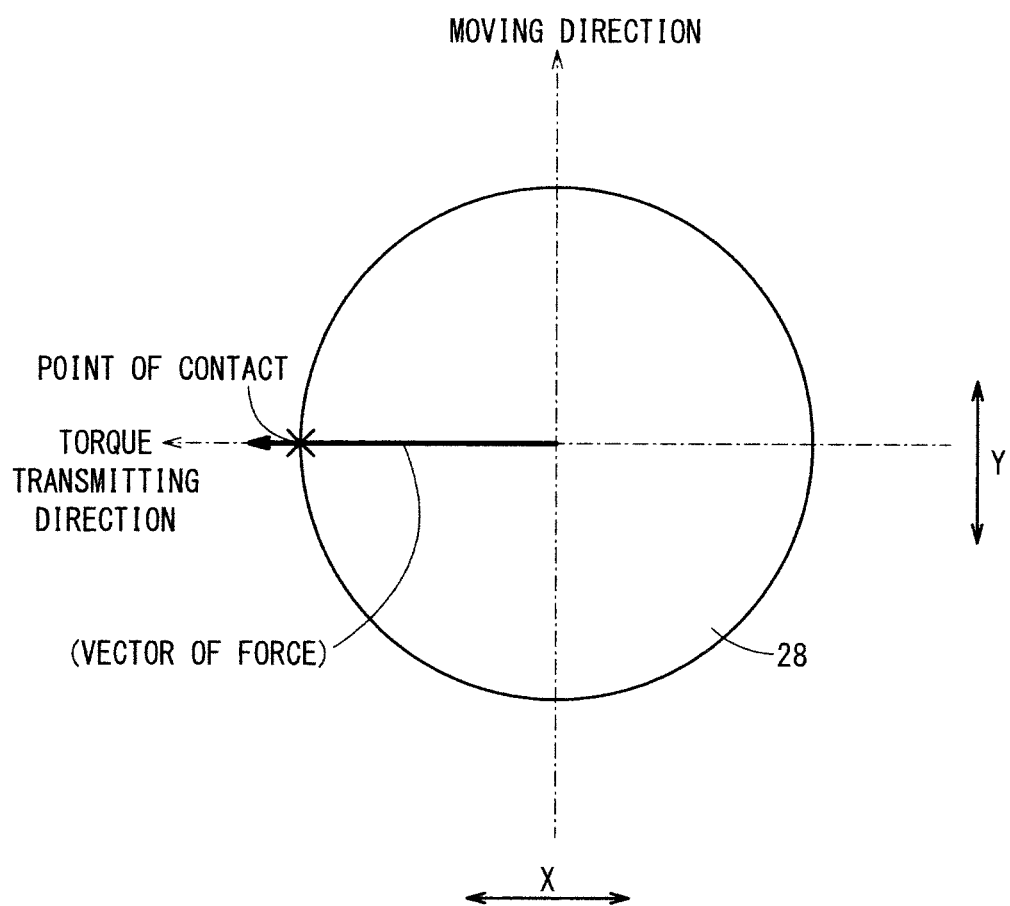
FIG. 8 is a diagram showing a vector, which represents a force acting when an inner roller and a trunnion contact each other through a single point of contact, assuming that the trunnion is in the form of a hypothetical cylinder.

If the inner roller 48 and the trunnion 28 are held in contact with each other through a single point of contact, then when the roller assembly 30 moves along the guide groove 20, the point of contact moves arcuately along a circumferential path (also representing the side wall surface of the trunnion 28) in FIG. 8, which shows in plan the trunnion 28 in the form of a hypothetical cylinder. As shown in FIG. 8, when the point of contact lies on a line that extends from a point of contact between the outer roller 52 and the inner wall surface of the guide groove 20, the acting force vector is aligned with the direction in which torque is transmitted.

At this time, a gripping force does not act between the roller assembly 30 and the trunnion 28. Stated otherwise, a force is not generated in the moving direction of the inner member 14 or the second transmission shaft 22, which could lead to slippage between the roller assembly 30 and the trunnion 28. In other words, a non-negligible amount of sliding resistance is developed, thereby resulting in increased sliding resistance.

Figure 9:
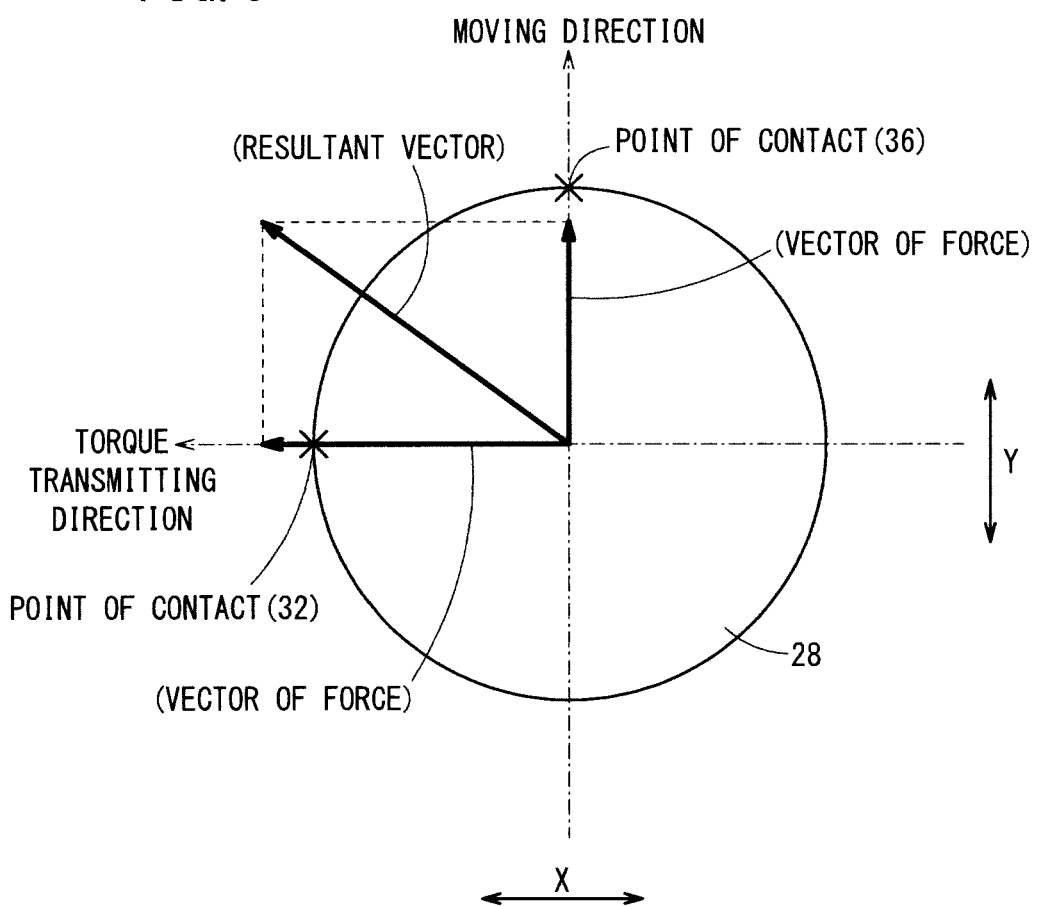
FIG. 9 is a diagram showing a vector, which represents a force acting when an inner roller and a trunnion contact each other through two points of contact, assuming that the trunnion is in the form of a hypothetical cylinder.

However, as described above, with the constant-velocity joint 10 according to the present embodiment, the inner roller 48 and the trunnion 28 are held in contact with each other, either at the two locations represented by the first lobe 32 and the second lobe 36, or at the two locations represented by the third lobe 40 and the fourth lobe 44. For example, as shown in FIG. 9, which is a plan view of the trunnion 28 in the form of a hypothetical cylinder, if the inner roller 48 and the trunnion 28 are held in contact with each other at the first lobe 32 and the second lobe 36, vectors of the acting forces are aligned with the torque transmitting direction and the moving direction, respectively. A resultant vector is obtained by adding such vectors to each other.

Consequently, a gripping force acts between the roller assembly 30 and the trunnion 28. Slippage, or stated otherwise, slipping resistance, is prevented from being generated between the roller assembly 30 and the trunnion 28. Thus, sliding resistance is reduced by a commensurate amount, compared with the situation illustrated in FIG. 8.

Figure 10:
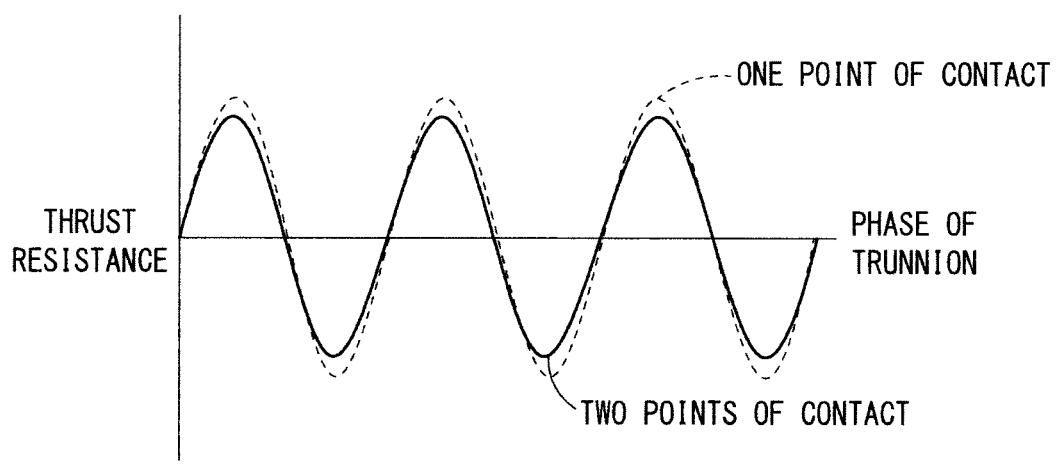
FIG. 10 is a graph showing thrust resistance that is generated in the structure shown in FIG. 8, and thrust resistance that is generated in the structure shown in FIG. 9, at each of respective phase angles.

As shown in FIG. 10, thrust resistance also is reduced commensurate with the reduction in the sliding resistance. Furthermore, since the inner roller 48 and the trunnion 28 are held in contact with each other at the aforementioned two locations, stresses are distributed, thereby preventing the trunnion 28 from suffering from undue fatigue or becoming worn.

Moreover, the inside diameter of the inner roller 48 is minimum at a portion that is located slightly lower than a substantially heightwise intermediate portion thereof. Therefore, the inner roller 48 has a low center of gravity, which minimizes circumferential oscillations of the inner roller 48. As a result, frictional resistance is reduced, further contributing to a reduction in thrust resistance.

Even if the points of contact move from the first lobe 32 and the second lobe 36 to the third lobe 40 and the fourth lobe 44, the constant-velocity joint 10 operates substantially in the same manner as described above. Inasmuch as the points of contact move during operation of the constant-velocity joint 10, the trunnions 28 and the inner rollers 48 are prevented from becoming locally worn.

According to the present embodiment, the constant-velocity joint 10 generates reduced thrust resistance, while durability of the constant velocity joint 10 is maintained.

The present invention is not limited to the above embodiment. Various changes and modifications may be made to the embodiment without departing from the scope of the invention as set forth in the appended claims.

For example, an additional lobe or lobes may be interposed between the first lobe 32 and the second lobe 36, between the second lobe 36 and the third lobe 40, between the third lobe 40 and the fourth lobe 44, and between the fourth lobe 44 and the first lobe 32, thereby increasing the number of points of contact between the inner roller 48 and the trunnion 28.

What is claimed is:

1. A constant-velocity joint for transmitting rotary drive power, comprising:
    an outer member having a plurality of guide grooves defined in a side wall surface thereof, the guide grooves being spaced at prescribed intervals from each other and extending in an axial direction of the outer member;
    an inner member inserted into the outer member, the inner member having an annular member and a plurality of holders, which project respectively from the annular member into the guide grooves; and
    a plurality of roller assemblies, wherein one of the plurality of roller assemblies is rotatably mounted on each holder, each of the roller assemblies including an inner roller, and an outer roller, which is disposed outwardly of and mounted on the inner roller through interposed rolling members,
    wherein each of the holders has a plurality of contact regions held in abutment against an inner circumferential wall surface of the inner roller, and a plurality of non-contact regions spaced from the inner circumferential wall surface of the inner roller, the contact regions and the non-contact regions being arranged alternately,
    wherein the contact regions at least include parallel regions where hypothetical tangential lines thereto extend parallel to longitudinal directions of the guide grooves, and perpendicular regions where hypothetical tangential lines thereto extend perpendicularly with respect to the longitudinal directions of the guide grooves,
    wherein the inner roller and the outer roller are configured to rotate integrally and simultaneously, and
    wherein the parallel regions include side wall surfaces, which are of a straight shape when viewed in a cross-sectional plane taken along a line that passes through the parallel regions and a diametrical center of each of the holders.

2. The constant-velocity joint according to claim 1, wherein each of the holders has a crisscross shape as viewed in plan.

3. The constant-velocity joint according to claim 2,
    wherein each holder comprises a first lobe, a second lobe, a third lobe, and a fourth lobe, the lobes serving as the contact regions,
    wherein each holder comprises a first recess, a second recess, a third recess, and a fourth recess, the recesses serving as the non-contact regions, and
    wherein the first, second, third, and fourth lobes and the first, second, third, and fourth recesses of each holder are arranged alternately.

4. The constant-velocity joint according to claim 3, wherein the first lobe and the third lobe serve as the parallel regions, and the second lobe and the fourth lobe serve as the perpendicular regions.

5. The constant-velocity joint according to claim 1, wherein the inner roller has an inside diameter, which is minimum at a portion thereof that is closer to the annular member than a substantially heightwise intermediate portion thereof.

* * * * *